UNITED STATES PATENT OFFICE.

LEWIS FEUCHTWANGER, OF NEW YORK, N. Y., ASSIGNOR TO H. G. FANT, C. C. GIDEON, AND W. D. COLT, OF WASHINGTON, D. C.

IMPROVEMENT IN PRESERVING WOOD.

Specification forming part of Letters Patent No. 123,467, dated February 6, 1872.

Specification describing a new and Improved Mode of Protecting Timber, invented by LEWIS FEUCHTWANGER, of New York city, in the county and State of New York.

My invention has for its object to furnish an improved mode of protecting timber for railroad sleepers, cross-ties, paving-blocks, stringers, shingles, clapboards, &c., which shall be effective in operation and convenient in application, requiring no complex and expensive apparatus; and it consists in the mode of protecting timber, hereinafter more fully set forth and described.

In carrying my improved mode of protecting timber into practical effect the wooden materials to be treated are piled up in a wooden or iron tank, the size and capacity of which are immaterial, and must depend upon the amount of timber to be treated at a time. A convenient size for the tank would be ten by twenty feet, and of such a depth as would give a capacity of about one thousand gallons. Hot water, sufficient to cover all the materials, is let into the tank, and caustic soda is then dissolved in the hot water in about the proportion of one hundred pounds of caustic soda to one thousand gallons of hot water. The tank is then closed firmly and steam-tight, and steam is introduced for from one to two hours, in which time all the albumen in the timber will be dissolved and removed. The steam is then shut off, the hot water drawn off, a quantity of cold water let or thrown into the tank, and again drawn off. The material is then partially dried by exposure to the air for a few hours, or by the application of artificial heat for a short time. A solution of silicate of soda standing at about forty or forty-one degrees B., and about two hundred gallons in quantity, is then introduced into the tank, and about six hundred gallons of hot water is added. Steam is let into the tank for about one hour and is then shut off, and the materials are left in the hot liquid about two hours longer. The liquid is then drawn off and replaced with crude pyroligneous acid, into which is thrown common lime, chalk, or magnesium-limestone in about the proportion of ten pounds to one hundred gallons of the crude pyroligneous acid. Steam is introduced for one hour and is then shut off, and the materials are allowed to remain in the liquid two hours longer.

The whole operation may be performed in the space of from eight to ten hours, and the materials may be dried in heated rooms, so as to be ready for use the next day.

Having thus described my invention, I claim as new and desire to secure by Letters Patent—

1. The mode of protecting timber, herein set forth and described.
2. The application of silicate of soda, while hot, to timber from which the albumen has been removed, substantially as herein described.
3. The application of crude pyroligneous acid and lime to timber from which the albumen has been removed, and which has been impregnated with silicate of soda, substantially as herein shown and described.

LEWIS FEUCHTWANGER.

Witnesses:
CHAS. H. GILL,
JAS. W. HALE.